April 20, 1943.     W. H. SNOW     2,317,307
STEERING WHEEL ATTACHMENT
Filed June 21, 1941
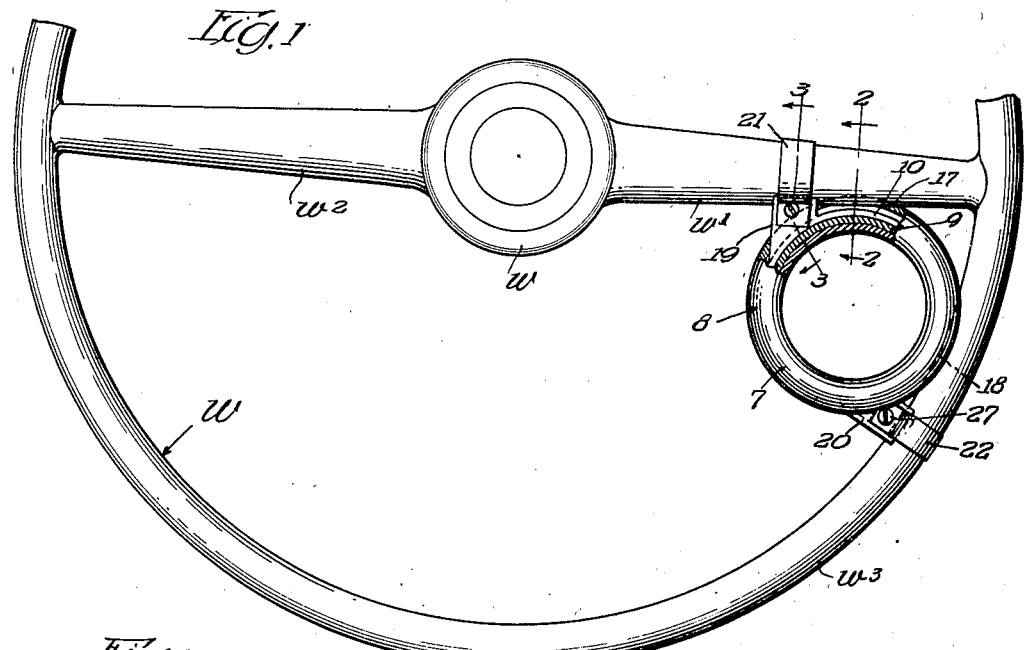
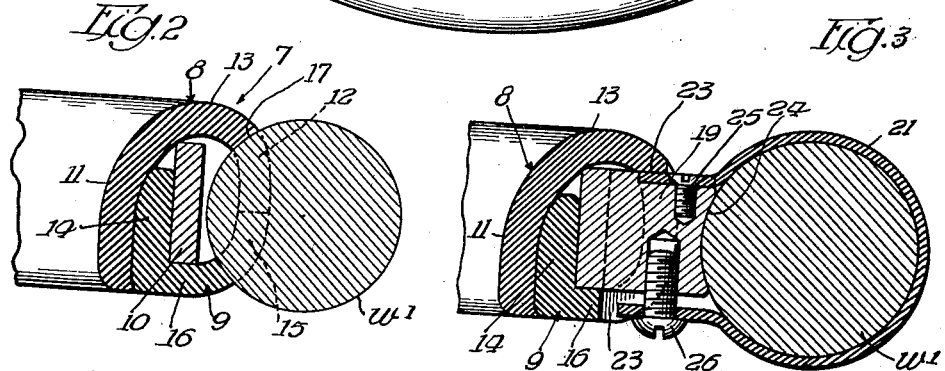
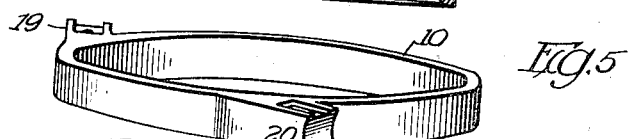
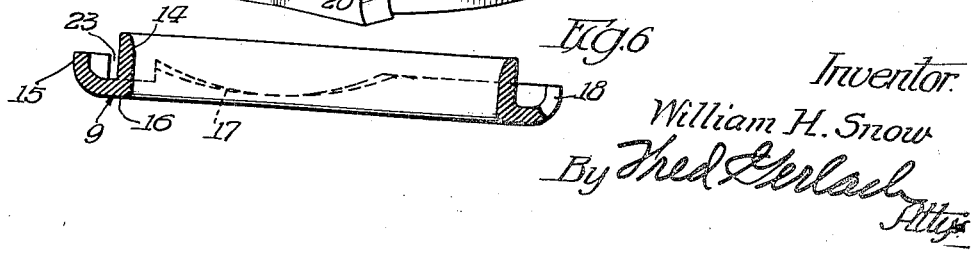
Inventor.
William H. Snow
By Fred Gerlach
Atty.

Patented Apr. 20, 1943

2,317,307

UNITED STATES PATENT OFFICE 2,317,307

STEERING WHEEL ATTACHMENT

William H. Snow, Chicago, Ill.

Application June 21, 1941, Serial No. 399,047

9 Claims. (Cl. 74—557)

The present invention relates generally to attachments for automobile steering wheels. More particularly the invention relates to that type of attachment which is designed or adapted to permit the operator of the automobile with which it is employed to spin or turn the steering wheel with one hand.

One object of the invention is to provide a steering wheel attachment of this type which is an improvement upon, and has certain advantages over, previously designed attachments of the same general character and for the same purpose.

Another object of the invention is to provide an attachment of the type and character under consideration which comprises a ring together with simple means for fixedly or rigidly securing the ring to one of the spokes of the steering wheel and the inner periphery of the steering wheel rim.

Another object of the invention is to provide a steering wheel attachment of the last mentioned character in which the ring is disposed within the plane of the steering wheel when it is in its attached or operative position, and has a smooth uninterrupted inner periphery in order that the operator or driver may grip it with two or more of his or her fingers when the attachment is used to spin or turn the wheel with one hand.

A further object of the invention is to provide a steering wheel attachment of the aforementioned type and character in which the ring is of composite design or construction and comprises complemental upper and lower annular members of molded material and an intermediate metallic annulus for strengthening or reenforcing purposes.

A still further object of the invention is to provide a steering wheel attachment which is capable of being produced at an extremely low cost, may be applied or attached with facility and is characterized by the fact that it offers no hindrance or obstruction to normal manipulation of the steering wheel with which it is employed.

Other objects of the invention and the various advantages and characteristics of the present steering wheel will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like letters and numerals of reference denote corresponding parts throughout the several views:

Figure 1 is a fragmentary plan view of an automobile steering wheel having applied thereto an attachment embodying the invention, parts of the attachment being broken away and other parts being shown in section for purposes of illustration;

Figure 2 is a vertical transverse section taken on the line 2—2 of Figure 1 and illustrating in detail the cross sectional construction or design of the ring of the attachment;

Figure 3 is a vertical transverse section taken on the line 3—3 of Figure 1 and showing the design and construction of the means for attaching the ring to the spoke of the steering wheel;

Figure 4 is a vertical section of the upper annular member of the ring;

Figure 5 is a perspective view of the intermediate metallic annulus for strengthening or reenforcing the ring; and Figure 6 is a vertical section of the lower annular member of the ring.

The attachment which is shown in the drawing constitutes the preferred form or embodiment of the invention. It is illustrated in connection with an automobile steering wheel W and serves, as hereinafter described, to assist the operator or driver of the automobile in spinning or readily rotating the steering wheel with one hand. The steering wheel W is of conventional design and comprises a hub $w$, a pair of spokes $w^1$ and $w^2$, and a circular rim $w^3$. The hub is suitably connected to the steering post of the automobile with which the wheel W is associated as well understood in the art. The spokes $w^1$ and $w^2$ are positioned diametrically opposite one another and are connected to, and radiate from, the hub. The rim $w^3$ is adapted to be gripped by the hands in connection with normal steering of the automobile and surrounds and is secured to the outer ends of the spokes $w^1$ and $w^2$.

The attachment is in the form of an accessory and as its parts comprises a ring 7 and releasable means for securing the ring in fixed relation with the steering wheel W.

The ring 7, as shown in Figure 1, is adapted to fit within one of the corners at the outer end of the spoke $w^1$. When the ring is in its operative position, that is, when it is attached to the wheel by the attaching means, it bears against and interlocks with the outer end of the spoke $w^1$ and the inner peripheral portion of the contiguous or adjoining part of the steering wheel rim $w^3$. The ring of the attachment is of composite design or construction and comprises an upper annular member 8, a lower annular member 9, and an intermediate annulus 10. The upper and lower members are preferably formed of molded composition material of the so-called plastic variety such, for example as Tenite or Bakelite. They are complemental and are reenforced by the annulus 10. The upper member is of U-shaped cross section and comprises an inner side wall 11, an outer side wall 12 and a curved top wall 13. The inner side wall 11 is of full height and has a smooth slightly curved or rounded uninterrupted inner periphery. When the attachment is to be used for purposes of spinning or quickly turning the steering wheel W the driver inserts two or more of his or her fingers into the ring and then brings them into loose gripping or contacting relation with the inner periphery or surface of the inner side wall 11 of the upper member 8 of the ring. When the fingers are in place the steering wheel W may be quickly or readily spun by swinging or moving the hand in a circular course. The top wall 13 of the upper annular member 8 serves to cross connect or hold in spaced relation the inner and outer side walls 11 and 12. The outer side wall depends from the outer portion of the top wall 13 and its height is approximately half that of the inner side wall 11. The lower annular member 9 of the ring comprises an inner side wall 14, an outer side wall 15 and a bottom wall 16. The inner side wall 14 is of greater diameter than the inner side wall 11 of the upper member 8. It surrounds and is cemented to the outer face or periphery of said inner side wall 11. The bottom wall 16 of the lower member 9 serves to cross connect and space apart the inner and outer side walls 14 and 15. The outer side wall 15 is the same in diameter as the outer side wall 12 of the upper member 8 and abuts against and is cemented or otherwise secured to said outer side wall 12. The annulus 10 of the ring 7 is preferably formed of metal. It is disposed within and between the upper and lower members 8 and 9 and surrounds and fits against the outer face or periphery of the inner side wall 14 of the lower member 9. It serves as a reenforcing medium for the ring and has a snug fit with the upper and lower members in order that it does not rattle when the attachment is subjected to vibration. The outer side walls of the upper and lower members are spaced from the annulus 10. Adjoining portions of such walls are cut away to form an arcuate seat 17. This seat is adapted to receive and interlock with the outer end of the spoke $w^1$ of the steering wheel W, as shown in Figure 1. Other adjoining portions of the outer side walls 12 and 15 are cut away to form a concave seat 18 for the inner portion of the steering wheel rim $w^3$. When the ring 7 is in its operative or assembled position with respect to the steering wheel W the interfitting connection between the seat 17 and the outer end of the spoke $w^1$ and the interfitting connection between the seat 18 and the adjacent portion of the steering wheel rim $w^3$ serve to hold the ring against upward or downward displacement with respect to the steering wheel.

The attaching means for the ring comprises a pair of outwardly extending lugs 19 and 20 and a pair of bands 21 and 22. The lug 19 forms an integral part of, and projects outwardly from the metallic annulus 10 of the ring 7 and carries or supports the band 21. It projects through a pair of adjoining notches 23 in the outer side walls of the upper and lower members 8 and 9 and embodies at its outer end a curved seat 24 for the adjacent portion of the steering wheel spoke $w^1$. The band 21 is in the form of a metallic strip and is shaped to surround the spoke $w^1$. One end of the band 21 fits against the top face of the lug 19 and is anchored to a screw 25. The other end of the band is clamped to the bottom face of the lug 19 by way of a clamp screw 26. When the screw 26 is turned to its fullest extent it serves to contract the band 21 around the spoke $w^1$ so that it, together with the lug 19, serves fixedly and rigidly to secure the ring 7 to said spoke. The lug 19 is preferably located inwardly of the seat 17. The lug 20 and the band 22 serve to anchor or attach the ring 7 to the steering wheel rim $w^3$. The lug 20 is formed integrally with and projects outwardly from the metallic annulus 10 of the ring. It projects through opposed or adjoining notches in the outer side walls of the upper and lower annular members of the ring and has a curved seat at its outer end for receiving the rim $w^3$. The band 22, like the band 21, is in the form of a metallic strip. It surrounds the steering wheel rim and has one end thereof anchored to the top face of the lug 19 by way of a screw 27. The other end of the band 22 underlies the bottom face of the lug 20 and is connected to the lug by way of a clamp screw (not shown). Such clamp screw is the same as, and corresponds in function to, the clamp screw 26 for the band 21.

When it is desired to apply the attachment the two clamp screws are first removed from the lugs 19 and 20. Thereafter the ring 7 is manipulated so as to bring the seat 17 into seated relation with the spoke $w^1$ of the steering wheel and the seat 18 into seated relation with the rim $w^3$. After this step or operation the bands 21 and 22 are brought into surrounding relation with the spoke and rim respectively and are contracted by way of the two clamp screws. When the clamp screws are in place the bands are contracted around the spoke and rim and serve, together with the lugs, fixedly and rigidly to secure the ring in place as hereinbefore described. When it is desired to use the attachment in connection with spinning of the wheel the driver inserts two or more fingers into the ring and then while the fingers are in loose gripping relation with the inner periphery of the inner side wall 11 of the upper member 8, swings his or her hand in a circular course. By reason of the fact that the upper member 8 is formed of molded composition material such as Tenite or Bakelite, the driver's fingers slide readily with respect to the ring in connection with turning of the steering wheel W.

The herein described attachment effectively and efficiently fulfills its intended purpose and is characterized by the fact that it does not hinder the user in connection with normal manipulation of the steering wheel with which it is associated since the ring 7 thereof is disposed substantially within the plane of the steering wheel. It is not likely to catch in the driver's sleeves or become loose. Due to the construction of the ring and attaching means the attachment as a whole may be manufactured at a low and reasonable cost. By reason of the fact that the attaching means includes bands 21 and 22 the attachment may be released or removed whenever desired.

The invention is not to be understood as restricted to the details set forth since these may be modified within the scope of the appended claims without departing from the spirit and scope of the invention.

Having thus described the invention what I claim as new and desire to secure by Letters Patent is:

1. An attachment designed for use in spinning or freely rotating a steering wheel of the hub, spoke and rim type, and comprising a rigid finger receiving ring adapted to fit against the outer end of one of the spokes and the adjoining portion of the rim of the wheel, and releasable means for securing the ring in place including an outwardly extending lug on the ring and adjacent that portion thereof that is adapted to fit against the spoke, a split spoke surrounding band having the ends thereof anchored to the lug, a second lug connected to, and extending outwardly from, that portion of the ring that is adjacent the portion which is adapted to fit against the adjoining portion of the wheel rim, and a split rim encircling band having the ends thereof connected to said second lug.

2. An attachment designed for use in spinning a vehicle steering wheel of the hub, spoke and rim type, and comprising a finger receiving ring adapted to fit within one of the corners between the outer ends of one of the spokes and the adjacent portion of the rim of the wheel and having in one portion thereof a concave seat for receiving the outer end of said one spoke and in another portion thereof a concave seat for receiving said adjoining portion of the rim, and means for releasably securing the ring in place including an outwardly extending lug adjacent the first mentioned portion of the ring, a split spoke surrounding contractable band having one end thereof anchored to the lug and its other end connected to the lug by a clamp screw, a second lug connected to the ring adjacent said another portion, and a split rim encircling contractable band having one end thereof anchored to said second lug and its other end connected to the latter by a clamp screw.

3. An attachment designed for use in spinning a vehicle steering wheel, and comprising a finger receiving ring adapted to be positioned inwardly of the rim of the wheel and embodying complemental upper and lower ring shaped members of U-shaped cross section, and releasable means for fixedly securing the ring in its operative position.

4. An attachment designed for use in spinning a vehicle steering wheel, and comprising a finger receiving ring adapted to be positioned inwardly of the rim of the wheel and consisting of complemental upper and lower annular members of U-shaped cross section, formed of molded material and secured together, and a stiff ring-reenforcing annulus confined between and within the two members, and releasable means for securing the ring in its operative position with the wheel.

5. An attachment designed for use in spinning a vehicle steering wheel, and comprising a finger receiving ring adapted to be positioned inwardly of the rim of the wheel and consisting of complemental upper and lower annular members of U-shaped cross section formed of molded plastic type material and secured together, and a stiff ring-reenforcing metallic annulus confined between and within the two members, and releasable means for securing the ring in its operative position with the wheel.

6. An attachment designed for use in spinning a vehicle steering wheel, and comprising a finger receiving ring adapted to be positioned inwardly of the rim of the wheel and consisting of complemental upper and lower annular members of U-shaped cross section formed of molded material and secured together, a stiff ring-reenforcing annulus confined between and within the two members, and releasable means for rigidly securing the ring in its operative position with respect to the wheel including a lug connected to the annulus and extending through notches in the members.

7. An attachment designed for use in spinning a vehicle steering wheel, and comprising a finger receiving ring adapted to be positioned inwardly of the rim of the wheel and including an upper ring shaped member having a full height inner side wall, a curved top wall and a short outer side wall in spaced relation with the inner side wall, and a complemental ring shaped lower member having an inner side wall fitting around and secured to the inner side wall of the upper member, a bottom wall and a short outer side wall in alignment and abutment with the outer side wall of the upper member, and means for securing the ring in its operative position with respect to the wheel.

8. An attachment designed for use in spinning a vehicle steering wheel, comprising a finger receiving ring adapted to be positioned inwardly of the rim of the wheel and consisting of an upper ring shaped member having a full height inner side wall, a curved top wall and a short outer side wall in spaced relation with the inner side wall, a complemental ring shaped lower member having an inner side wall fitting around and secured to the inner side wall of the upper member, a bottom wall and a short outer side wall in alignment and abutment with the outer side wall of the upper member, and a stiff reenforcing annulus confined between the upper and lower members and extending around the inner side wall of the lower member, and means for securing the ring in its operative position with respect to the wheel.

9. An attachment designed for use in spinning a vehicle steering wheel, comprising a finger receiving ring adapted to be positioned inwardly of the rim of the wheel and consisting of an upper ring shaped member having a full height inner side wall, a curved top wall and a short outer side wall in spaced relation with the inner side wall, a complemental ring shaped lower member having an inner side wall fitting around and secured to the inner side wall of the upper member, a bottom wall and a short outer side wall in alignment and abutment with the outer side wall of the upper member, and a stiff reenforcing annulus confined between the upper and lower members and extending around the inner side wall of the lower member, and means for securing the ring in place including a lug on the annulus and projecting outwards through opposed notches in the outer side walls of the two members.

WILLIAM H. SNOW.